United States Patent
Mehl

(10) Patent No.: US 9,926,433 B2
(45) Date of Patent: Mar. 27, 2018

(54) POLYOLEFIN COMPOSITION AND PROCESS FOR PREPARING THE SAME

(71) Applicant: Milliken & Company, Spartanburg, SC (US)

(72) Inventor: Nathan A. Mehl, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 14/985,836

(22) Filed: Dec. 31, 2015

(65) Prior Publication Data

US 2016/0185937 A1    Jun. 30, 2016

Related U.S. Application Data

(60) Provisional application No. 62/098,808, filed on Dec. 31, 2014.

(51) Int. Cl.
C08K 5/1575 (2006.01)
C08L 23/10 (2006.01)
C08K 5/00 (2006.01)

(52) U.S. Cl.
CPC .......... C08K 5/1575 (2013.01); C08K 5/0083 (2013.01); C08L 23/10 (2013.01)

(58) Field of Classification Search
CPC ...... C08L 23/10; C08K 5/1575; C08K 5/0083
USPC ...................................................... 524/108
See application file for complete search history.

(56) References Cited

U.S. PATENT DOCUMENTS

| | | |
|---|---|---|
| 4,371,645 A | 2/1983 | Mahaffey, Jr. |
| 5,049,605 A | 9/1991 | Rekers |
| 6,582,503 B2 | 6/2003 | Dotson et al. |
| 7,157,510 B2 | 1/2007 | Xie et al. |
| 7,262,236 B2 | 8/2007 | Xie et al. |
| 2002/0188044 A1 | 12/2002 | Dotson et al. |
| 2003/0008953 A1* | 1/2003 | Dotson .................. A61K 8/042 524/109 |
| 2006/0270766 A1 | 11/2006 | Xu et al. |

OTHER PUBLICATIONS

PCT/US2015/068123 International Search Report, dated Mar. 15, 2016, 4 pages.
PCT/US2015/068123 Written Opinion, dated Mar. 15, 2016, 5 pages.

* cited by examiner

*Primary Examiner* — Ling Siu Choi
*Assistant Examiner* — Ronald Grinsted
(74) *Attorney, Agent, or Firm* — Robert M. Lanning

(57) ABSTRACT

A polyolefin composition comprises (a) a polypropylene polymer, (b) 1,3:2,4-bis-O-[(3,4-dimethylphenyl)methylene]-D-glucitol, and (c) 1,3:2,4-bis-O-[(3,4-dichlorophenyl)methylene]-D-glucitol. A method for producing a polyolefin composition comprises the steps of (a) providing a polypropylene polymer; (b) providing 1,3:2,4-bis-O-[(3,4-dimethylphenyl)methylene]-D-glucitol; (c) providing 1,3:2,4-bis-O-[(3,4-dichlorophenyl)methylene]-D-glucitol; (d) mixing the 1,3:2,4-bis-O-[(3,4-dimethylphenyl)methylene]-D-glucitol and the 1,3:2,4-bis-O-[(3,4-dichlorophenyl)methylene]-D-glucitol with the polypropylene polymer to produce a mixture; (e) heating the mixture to a temperature equal to or greater than the melting point of the polypropylene polymer; and (f) cooling the heated mixture to a temperature below the melting point of the polypropylene polymer, thereby producing a polyolefin composition.

23 Claims, No Drawings

POLYOLEFIN COMPOSITION AND PROCESS FOR PREPARING THE SAME

CROSS-REFERENCE TO RELATED PATENT APPLICATIONS

This application claims, pursuant to 35 U.S.C. § 119(e)(1), priority to and the benefit of the filing date of U.S. Patent Application No. 62/098,808 filed on Dec. 31, 2014, which application is hereby incorporated by reference in its entirety.

TECHNICAL FIELD OF THE INVENTION

This application relates to polyolefin compositions comprising clarifying agents and processes for producing such compositions.

BACKGROUND

The plastics (polyolefin) processing industry is constantly in search of means to improve the cost of manufacturing plastic articles. The cost of manufacture is influenced by a great many factors, but one of the major influences is cycle time. In the context of injection molding, cycle time refers to the time interval required to complete a single molding cycle and produce a single molded article. The molding cycle involves closing the mold, injecting molten plastic into the mold cavity, allowing the molten plastic to cool and partially solidify in the mold cavity, and ejecting the resulting part from the mold. The time required to complete the steps of closing the mold and ejecting the finished part from the mold are dictated by machine design. The steps of injecting the molten plastic into the mold cavity and cooling and solidifying the plastic are influenced by the properties of the polymer used in the process. For example, polymers having a relatively high melt viscosity cannot be rapidly injected into the mold cavity. Also, polymers having a relatively high melt viscosity typically must be heated to a relatively high temperature to ensure that they are sufficiently fluid to flow at the desired throughput and into the intricacies of the mold cavity. When a higher temperature is used, it takes longer for the molten polymer to cool to a temperature at which it is sufficiently solid for the part to be ejected from the mold cavity. (Heating the polymer to a higher temperature also requires greater amounts of energy, which increases the cost of the manufacturing operation and the cost of manufacturing each article.) Thus, in an effort to decrease cycle time and cost, the industry has begun to shift towards processes employing lower temperatures and polymers having lower melt viscosities. These lower melt viscosity polymers are capable of being fed through the processing equipment (e.g., passed through an extruder, injected into a mold cavity, etc.) at higher throughputs even at lower processing temperatures.

With this shift towards lower melt viscosity polymers and lower processing temperatures, the industry has discovered that some polymer additives do not function as expected or as desired. For example, in the case of clarifying agents, it has been found that Millad® 3988 clarifying agent (commercially sold by Milliken & Company) does not produce the same desirable low haze levels in low melt viscosity polymers as it does in higher melt viscosity polymer. This hindered performance can be problematic for a producer that wishes to lower cost by moving to a lower melt viscosity polymer while maintaining acceptable haze levels.

Thus, a need remains for additives, such as clarifying agents, which are suitable for use in lower melt viscosity polymers. A need also remains for polyolefin compositions containing such additives. The various embodiments described herein seek to provide such additives and compositions.

BRIEF SUMMARY OF THE INVENTION

The invention generally provides polyolefin (e.g., polypropylene) compositions exhibiting improved (i.e., lower) haze levels. In certain embodiments, the invention provides polyolefin compositions in which the polyolefin (e.g., polypropylene) polymer has a relatively low melt viscosity and, optionally, a relatively narrow molar mass distribution, as evidenced by a lower Flow Rate Ratio (FRR).

Thus, in a first embodiment, the invention provides a polyolefin composition comprising:
 (a) a polypropylene polymer;
 (b) 1,3:2,4-bis-O-[(3,4-dimethylphenyl)methylene]-D-glucitol;
 (c) 1,3:2,4-bis-O-[(3,4-dichlorophenyl)methylene]-D-glucitol,
wherein the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 9:1 to about 1:9, and the polyolefin composition has an apparent melt viscosity of about 450 Pa·s or less at an apparent shear rate of 100 $s^{-1}$ and a temperature of 190° C.

In a second embodiment, the invention provides a method for producing a polyolefin composition, the method comprising the steps of:
 (a) providing a polypropylene polymer;
 (b) providing 1,3:2,4-bis-O-[(3,4-dimethylphenyl)methylene]-D-glucitol;
 (c) providing 1,3:2,4-bis-O-[(3,4-dichlorophenyl)methylene]-D-glucitol;
 (d) mixing the 1,3:2,4-bis-O-[(3,4-dimethylphenyl)methylene]-D-glucitol and the 1,3:2,4-bis-O-[(3,4-dichlorophenyl)methylene]-D-glucitol with the polypropylene polymer to produce a mixture;
 (e) heating the mixture to a temperature equal to or greater than the melting point of the polypropylene polymer; and
 (f) cooling the heated mixture to a temperature below the melting point of the polypropylene polymer, thereby producing a polyolefin composition, wherein the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 9:1 to about 1:9, and the polyolefin composition has an apparent melt viscosity of about 450 Pa·s or less at an apparent shear rate of 100 $s^{-1}$ and a temperature of 190° C.

DETAILED DESCRIPTION OF THE INVENTION

In a first embodiment, the invention broadly provides a polyolefin composition comprising: (a) a polypropylene polymer, (b) 1,3:2,4-bis-O-[(3,4-dimethylphenyl)methylene]-D-glucitol; and (c) 1,3:2,4-bis-O-[(3,4-dichlorophenyl)methylene]-D-glucitol.

The polyolefin composition comprises a polyolefin polymer. The polyolefin polymer can be any suitable polyolefin, such as a polypropylene, a polyethylene, a polybutylene, a poly(4-methyl-1-pentene), and a poly(vinyl cyclohexane).

In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %.

The polyolefin polymer (e.g., polypropylene polymer) used in the composition can be a polymer that has been manufactured to possess the apparent melt viscosity, Melt Flow Rate, and/or Flow Rate Ratio described below for the polyolefin composition. For example, polypropylene polymers suitable for use in the composition include those manufactured in such a manner that the polymer sold by the manufacturer possesses one of the apparent melt viscosity values recited below for the polyolefin composition. Alternatively, a virgin polypropylene polymer that does not possess the desired characteristics can be modified through the addition of one or more additives. For example, the polymer can be combined with an organic peroxide or a vis-breaking agent in order to modify one or more characteristics of the polymer. Examples of organic peroxides suitable for such use include but are not limited to: 2,5-dimethyl-2,5-di(tert-butylperoxy)hexane, 2,5-dimethyl-2,5-di(tert-butyl peroxy)hexyne-3,3,6,6,9,9-pentamethyl-3-(ethyl acetate)-1,2,4,5-tetraoxy cyclononane, tert-butyl hydroperoxide, hydrogen peroxide, dicumyl peroxide, tert-butyl peroxy isopropyl carbonate, di-tert-butyl peroxide, p-chlorobenzoyl peroxide, dibenzoyl diperoxide, tert-butyl cumyl peroxide, tert-butyl hydroxyethyl peroxide, di-tert-amyl peroxide, 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane, 2,5-di-tert-butylperoxide, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

When used, the organic peroxide or vis-breaking agent can be present in the polymer composition in any suitable amount. The suitable amount of organic peroxide will depend upon several factors, such as the particular polymer that is used in the composition, the starting properties of the polymer, and the desired change in the properties of the polymer. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, about 0.05 wt. % (about 500 ppm) or less based on the total weight of the polymer composition. Thus, in a series of preferred embodiments, the organic peroxide can be present in the polymer composition in an amount of about 10 to about 5,000 ppm, about 50 to about 3,000 ppm, about 50 to about 2,000 ppm, or about 100 to about 1,000 ppm, based on the total weight of the polymer composition.

As noted above, the polyolefin composition comprises 1,3:2,4-bis-O-[(3,4-dimethylphenyl)methylene]-D-glucitol and 1,3:2,4-bis-O-[(3,4-dichlorophenyl)methylene]-D-glucitol. These compounds are acetals that can be produced by the reaction of an alditol with a substituted benzenecarbaldehyde compound. In the case of 1,3:2,4-bis-O-[(3,4-dimethylphenyl)methylene]-D-glucitol, the compound can be produced by the reaction of approximately 1 mole of D-glucitol with approximately 2 moles of o-xylenecarbaldehyde. In the case of 1,3:2,4-bis-O-[(3,4-dichlorophenyl)methylene]-D-glucitol, the compound can be produced by the reaction of approximately 1 mole of D-glucitol with approximately 2 moles of 3,4-dichlorobenzenecarbaldehyde. The 1,3:2,4-bis-O-[(3,4-dimethylphenyl)methylene]-D-glucitol and 1,3:2,4-bis-O-[(3,4-dichlorophenyl)methylene]-D-glucitol can be provided in any suitable physical form, but generally each compound is provided in the form of a powder. The 1,3:2,4-bis-O-[(3,4-dimethylphenyl)methylene]-D-glucitol and 1,3:2,4-bis-O-[(3,4-dichlorophenyl)methylene]-D-glucitol can be blended together prior to incorporation into the polymer, or the 1,3:2,4-bis-O-[(3,4-dimethylphenyl)methylene]-D-glucitol and 1,3:2,4-bis-O-[(3,4-dichlorophenyl)methylene]-D-glucitol can be separately added to the polymer.

As noted above, the 1,3:2,4-bis-O-[(3,4-dimethylphenyl)methylene]-D-glucitol and 1,3:2,4-bis-O-[(3,4-dichlorophenyl)methylene]-D-glucitol typically are provided in the form of powders, which powders contain many fine particles. The particles present in the powders generally are grouped into three different particle types of increasing size: primary particles; aggregates; and agglomerates. The primary particles generally are single crystals of the compound or fragments of such single crystals. The aggregates are comprised of two or more primary particles that have become strongly bound to each other. The aggregates cannot be reduced in size (e.g., reduced to their constituent primary particles) except through milling. The agglomerates are comprised of several primary particles and/or aggregates that have become weakly associated or bound together. The agglomerates can be reduced in size (e.g., broken apart and reduced to their constituent primary particles and/or aggregates) by the application of relatively modest mechanical forces. For example, the agglomerates can be reduced in size upon dispersion in a suitable liquid medium. The agglomerates typically contain relatively large voids within their interior dimensions, and these voids are filled with air. When such agglomerates are dispersed in the molten polymer during processing, the agglomerates break apart as the compound dissolves in the molten polymer. The air trapped in the voids can then become entrained in the molten polymer, and this entrained air leads to the formation of defects (e.g., white specks and/or bubbles) in the polymer composition.

These powders can have any suitable particle size. However, in order to facilitate dissolution of the compounds in the molten polymer and prevent the formation of defects (e.g., white specks or bubbles) in the polymer composition, Applicants believe that it is advantageous for the particles to have a relatively small particle size. In a preferred embodiment, the volume mean diameter (i.e., the D[4,3]) of the 1,3:2,4-bis-O-[(3,4-dichlorophenyl)methylene]-D-glucitol particles is about 40 μm or less, about 35 μm or less, about 30 μm or less, or about 25 μm or less. Further, the $D_{90}$ of the 1,3:2,4-bis-O-[(3,4-dichlorophenyl)methylene]-D-glucitol particles preferably is about 80 μm or less, about 75 μm or less, about 70 μm or less, about 65 μm or less, about 60 μm or less, or about 55 μm or less. The particle size of the 1,3:2,4-bis-O-[(3,4-dimethylphenyl)methylene]-D-glucitol can be the same (e.g., in terms of volume mean diameter, $D_{90}$, or both) as the particle size of the 1,3:2,4-bis-O-[(3,4-dichlorophenyl)methylene]-D-glucitol. Alternatively, the particle size of the 1,3:2,4-bis-O-[(3,4-dimethylphenyl)methylene]-D-glucitol can be smaller (e.g., in terms of volume mean diameter, $D_{90}$, or both) than the particle size of the 1,3:2,4-bis-O-[(3,4-dichlorophenyl)methylene]-D-glucitol. In a preferred embodiment, the volume mean diameter (i.e., the D[4,3]) of the 1,3:2,4-bis-O-[(3,4-dimethylphenyl)methylene]-D-glucitol particles is about 40 μm or less, about 35 μm or less, about 30 μm or less, about 25 μm or less, about 20 μm or less, about 15 μm or less, about 10 μm or less, or about 7.5 μm or less. Further, the $D_{90}$ of the 1,3:2,4-bis-O-[(3,4-dimethylphenyl)methylene]-D-glucitol particles preferably is about 80 μm or less, about 75 μm or less, about 70 μm or less, about 65 μm or less, about 60 μm or less, about 55 μm or less, about 50 μm or less, about 45 μm or less, about 40 μm or less, about 35 μm or less, about 30 μm or less, about 25 μm or less, about 20 μm or less, about 15 μm or less, about 10 μm or less, or about 7.5 μm or less.

The particle size of the 1,3:2,4-bis-O-[(3,4-dimethylphenyl)methylene]-D-glucitol and 1,3:2,4-bis-O-[(3,4-dichlorophenyl)methylene]-D-glucitol can be measured using any suitable technique. For example, the particle size of the compounds can be measured via dynamic light scattering using one of the many commercially available instruments designed for such measurements. When a dynamic light scattering technique is used, a representative sample of the particles generally is dispersed in a liquid medium and a sample of this liquid medium is introduced into the dynamic light scattering instrument. Any suitable liquid medium can be used, but water generally is the preferred medium. In order to facilitate dispersion of the particles in the liquid medium, a surfactant, preferably a non-ionic surfactant (e.g., an octylphenol surfactant), can be added to the water and the resulting mixture (i.e., water, surfactant, and particles) can be stirred for a sufficient time for the particles to disperse (e.g., for 1-5 minutes).

The 1,3:2,4-bis-O-[(3,4-dimethylphenyl)methylene]-D-glucitol and 1,3:2,4-bis-O-[(3,4-dichlorophenyl)methylene]-D-glucitol can be present in the polyolefin composition in any suitable relative amounts. For example, the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition preferably can be about 9:1 or less, about 8:1 or less, about 7:1 or less, about 6:1 or less, about 5:1 or less, about 4:1 or less, or about 3:1 or less. The ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition preferably can be about 1:9 or more, about 1:8 or more, about 1:7 or more, about 1:6 or more, about 1:5 or more, about 1:4 or more, or about 1:3 or more. In one preferred embodiment, the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 9:1 to about 1:9. In a series of sequentially more preferred embodiments, the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 8:1 to about 1:8, about 7:1 to about 1:7, about 6:1 to about 1:6, about 5:1 to about 1:5, about 4:1 to about 1:4, or about 3:1 to about 1:3.

The 1,3:2,4-bis-O-[(3,4-dimethylphenyl)methylene]-D-glucitol and 1,3:2,4-bis-O-[(3,4-dichlorophenyl)methylene]-D-glucitol can be present in the polyolefin composition in any suitable absolute amounts. Typically, the amount of 1,3:2,4-bis-O-[(3,4-dimethylphenyl)methylene]-D-glucitol and 1,3:2,4-bis-O-[(3,4-dichlorophenyl)methylene]-D-glucitol present in the polyolefin composition is about 500 parts-per-million (ppm) or more based on the weight of the polymer (e.g., polypropylene polymer) present in the polyolefin composition. Preferably, the amount of 1,3:2,4-bis-O-[(3,4-dimethylphenyl)methylene]-D-glucitol and 1,3:2,4-bis-O-[(3,4-dichlorophenyl)methylene]-D-glucitol present in the polyolefin composition is about 750 ppm or more, about 1,000 ppm or more, about 1,250 ppm or more, or about 1,500 ppm or more based on the weight of the polymer (e.g., polypropylene polymer) present in the polyolefin composition. The amount of 1,3:2,4-bis-O-[(3,4-dimethylphenyl)methylene]-D-glucitol and 1,3:2,4-bis-O-[(3,4-dichlorophenyl)methylene]-D-glucitol present in the polyolefin composition typically is also about 4,000 ppm or less based on the weight of the polymer (e.g., polypropylene polymer) present in the polyolefin composition. Preferably, the amount of 1,3:2,4-bis-O-[(3,4-dimethylphenyl)methylene]-D-glucitol and 1,3:2,4-bis-O-[(3,4-dichlorophenyl)methylene]-D-glucitol present in the polyolefin composition is about 3,500 ppm or less, about 3,000 ppm or less, about 2,750 ppm or less, or about 2,500 ppm or less based on the weight of the polymer (e.g., polypropylene polymer) present in the polyolefin composition. Thus, in a series of sequentially more preferred embodiments, the amount of 1,3:2,4-bis-O-[(3,4-dimethylphenyl)methylene]-D-glucitol and 1,3:2,4-bis-O-[(3,4-dichlorophenyl)methylene]-D-glucitol present in the polyolefin composition is about 500 ppm to about 4,000 ppm, about 750 ppm to about 3,500 ppm, about 1,000 ppm to about 3,000 ppm, about 1,250 ppm to about 2,750 ppm, or about 1,500 ppm to about 2,500 ppm based on the weight of the polymer (e.g., polypropylene polymer) present in the polyolefin composition.

The polyolefin composition can have any suitable apparent melt viscosity. The apparent melt viscosity of the polyolefin composition can be measured using any suitable method. For example, the apparent melt viscosity can be determining using the test method described in ASTM Test Method D3835-08 entitled "Standard Test Method for Determination of Properties of Polymeric Materials by Means of a Capillary Rheometer." While this test method provides that 220° C. is the testing temperature typically employed in testing polypropylene compositions, the applicant believes that 190° C. is a more suitable temperature since it better approximates the lower processing temperatures that the applicant seeks to enable with the disclosed composition and method. Thus, the apparent melt viscosities for the polypropylene-containing polyolefin compositions listed herein preferably are determined using the above-referenced test method at a temperature of 190° C. The apparent melt viscosity of the polyolefin composition can be measured at any suitable apparent shear rate. It is believed that an apparent shear rate of 100 $s^{-1}$ is preferred because it closely approximates the shear that a polymer composition experiences during typical processing conditions. When measuring the apparent melt viscosity of the polyolefin composition, the capillary rheometer preferably is equipped with a 1.00 mm diameter capillary die with a length to diameter ratio of 30:1. Further, the polyolefin composition preferably is allowed to remain in the capillary rheometer for a dwell time of six (6) minutes prior to beginning the test. Lastly, the apparent melt viscosity of the polyolefin composition preferably is determined after the polymer, 1,3:2,4-bis-O-[(3,4-dimethylphenyl)methylene]-D-glucitol, 1,3:2,4-bis-O-[(3,4-dichlorophenyl)methylene]-D-glucitol, and optional components (e.g., peroxide) have been melt processed (e.g., passed through an extruder).

Preferably, the polyolefin composition has an apparent melt viscosity of about 450 Pa·s or less at an apparent shear rate of 100 $s^{-1}$. More preferably, the polyolefin composition has an apparent melt viscosity of about 440 Pa·s or less, about 430 Pa·s or less, about 420 Pa·s or less, about 410 Pa·s or less, about 400 Pa·s or less, about 375 Pa·s or less, about 350 Pa·s or less, about 325 Pa·s or less, or about 300 Pa·s or less at an apparent shear rate of 100 $s^{-1}$ and a temperature of 190° C.

The polyolefin composition can have any suitable Melt Flow Rate. The Melt Flow Rate of the polyolefin composition can be determined by any suitable method. For example, the Melt Flow Rate of the polyolefin composition can be determined using Procedure B in ASTM Standard D1238-10 entitled "Standard Test Method for Melt Flow Rates of Thermoplastics by Extrusion Plastometer." The Melt Flow Rate of the polyolefin composition preferably is measured using the aforementioned standard test method. Preferably, the polyolefin composition has a Melt Flow Rate of 20 g/10 min or more. More preferably, the polyolefin composition has a Melt Flow Rate of about 25 g/10 min or more, about 30 g/10 min or more, about 35 g/10 min or more, about 40 g/10 min or more, about 45 g/10 min or more, or about 50 g/10 min or more. As in the measurement of the apparent melt viscosity, the Melt Flow Rate of the polyolefin composition preferably is determined after the polymer, 1,3:2,4-bis-O-[(3,4-dimethylphenyl)methylene]-D-glucitol, 1,3:2,4-bis-O-[(3,4-dichlorophenyl)methylene]-D-glucitol, and optional components (e.g., peroxide) have been melt processed (e.g., passed through an extruder).

As will be understood by those of ordinary skill in the art, the polyolefin polymer will contain a population of discrete polymer chains, and those polymer chains will have varying lengths and molar masses. The statistical distribution of the lengths/molar masses of the polymer chains contained in the polymer is generally referred to as the molar mass distribution or molecular weight distribution. The polyolefin polymers used in the compositions described herein can have any suitable molar mass distribution. For example, the polyolefin polymer can have a molar mass distribution exhibiting a single mode or the molar mass distribution can exhibit a plurality of modes (e.g., bimodal, trimodal, etc.). The breadth of the molar mass distribution of a polymer can be expressed using the polydispersity index. The polydispersity index is calculated by measuring the number average molar mass and the mass average molar mass (i.e., weight average molar mass) of the polymer, and then dividing the mass average molar mass of the polymer by the number average molar mass of the polymer. The result is a dimensionless unit that quantifies the breadth of the molar mass distribution, with higher values indicating greater breadth in the molar mass distribution. The breadth of the molar mass distribution can also be indirectly quantified by measuring and comparing the Melt Flow Rate of the polymer (or a composition containing the polymer) under different conditions to yield a Flow Rate Ratio (FRR). This method is described, for example, in Procedure D of ASTM Standard D1238 entitled "Standard Test Method for Melt Flow Rates of Thermoplastics by Extrusion Plastometer." Preferably, the FRR is calculated using the Melt Flow Rate measured using the 10 kg weight specified in the standard ($MFR_{10}$) and the Melt Flow Rate measured using the 2 kg weight specified in the standard ($MFR_2$). The polyolefin composition described herein can have any suitable FRR. Preferably, the polyolefin composition has a FRR ($MFR_{10}/MFR_2$) of about 16 or less. More preferably, the polyolefin composition has a FRR ($MFR_{10}/MFR_2$) of about 15.5 or less or about 15 or less. As in measuring the apparent melt viscosity and the Melt Flow Rate, the Flow Rate Ratio of the polyolefin composition preferably is determined after the polymer, 1,3:2,4-bis-O-[(3,4-dimethylphenyl)methylene]-D-glucitol, 1,3:2,4-bis-O-[(3,4-dichlorophenyl)methylene]-D-glucitol, and optional components (e.g., peroxide) have been melt processed (e.g., passed through an extruder).

The polyolefin composition can contain other polymer additives in addition to the 1,3:2,4-bis-O-[(3,4-dimethylphenyl)methylene]-D-glucitol and 1,3:2,4-bis-O-[(3,4-dichlorophenyl)methylene]-D-glucitol. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

As noted above, the polyolefin composition can contain nucleating agents in addition to the other components described above. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the polyolefin composition of the invention can also contain one or more additional clarifying agents. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, amide derivatives of 1,3,5-benzenetriamine, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

The polyolefin composition described herein can be produced by any suitable method. For example, the polyolefin composition can be produced by simple mixing (e.g., high shear or high intensity mixing) of the 1,3:2,4-bis-O-[(3,4-dimethylphenyl)methylene]-D-glucitol, the 1,3:2,4-bis-O-[(3,4-dichlorophenyl)methylene]-D-glucitol, the polyolefin polymer, and any additional optional components. Alternatively, the 1,3:2,4-bis-O-[(3,4-dimethylphenyl)methylene]-D-glucitol and the 1,3:2,4-bis-O-[(3,4-dichlorophenyl)methylene]-D-glucitol (as well as additional optional components, such as those described above) can be pre-blended to provide an additive composition. This additive composition can then be mixed with the polyolefin polymer to produce the polyolefin composition described above. The polyolefin composition can be provided in any form suitable for use in further processing to produce an article. For example, the polyolefin composition can be provided in the form of a powder (e.g., free-flowing powder), flake, pellet, prill, tablet, agglomerate, and the like.

In a second embodiment, the invention provides a method for producing the polyolefin composition described above. The method comprising the steps of: (a) providing a polypropylene polymer; (b) providing 1,3:2,4-bis-O-[(3,4-dimethylphenyl)methylene]-D-glucitol; (c) providing 1,3:2,4-bis-O-[(3,4-dichlorophenyl)methylene]-D-glucitol; (d) mixing the 1,3:2,4-bis-O-[(3,4-dimethylphenyl)methylene]-D-glucitol and the 1,3:2,4-bis-O-[(3,4-dichlorophenyl)methylene]-D-glucitol with the polypropylene polymer to produce a mixture; (e) heating the mixture to a temperature equal to or greater than the melting point of the polypropylene polymer; and (f) cooling the heated mixture to a temperature below the melting point of the polypropylene polymer, thereby producing a polyolefin composition.

The polypropylene polymer, 1,3:2,4-bis-O-[(3,4-dimethylphenyl)methylene]-D-glucitol, and 1,3:2,4-bis-O-[(3,4-dichlorophenyl)methylene]-D-glucitol used in the method can be any suitable components. Preferably, the polypropylene polymer, 1,3:2,4-bis-O-[(3,4-dimethylphenyl)methylene]-D-glucitol, and 1,3:2,4-bis-O-[(3,4-dichlorophenyl)methylene]-D-glucitol used in the method meet the criteria specified above for the components of the polyolefin composition disclosed herein. As with the polyolefin composition described above, the method can utilize any one or more of the optional components described above (e.g., a peroxide) in addition to the 1,3:2,4-bis-O-[(3,4-dimethylphenyl)methylene]-D-glucitol, the 1,3:2,4-bis-O-[(3,4-dichlorophenyl)methylene]-D-glucitol, and the polypropylene polymer. Further, the polyolefin composition produced by the method preferably exhibits the properties (e.g., apparent melt viscosity, Melt Flow Rate, and/or Flow Rate Ratio) described above in connection with this first embodiment.

The method described above can be performed using any suitable apparatus. For example, the method can be performed by feeding the 1,3:2,4-bis-O-[(3,4-dimethylphenyl)methylene]-D-glucitol, the 1,3:2,4-bis-O-[(3,4-dichlorophenyl)methylene]-D-glucitol, and the polypropylene polymer to an extruder. In the extruder, the components are mixed and heated to a temperature equal to or greater than the melting point of the polypropylene polymer. The mixture generally is then ejected from the extruder where it is allowed to cool as described above. Alternatively, the components can be mixed in a suitable mixing apparatus, such as a ribbon blender or high intensity mixer, prior to introducing the components into an apparatus that heats the mixture to the desired temperature.

As noted above, the mixture of the 1,3:2,4-bis-O-[(3,4-dimethylphenyl)methylene]-D-glucitol, the 1,3:2,4-bis-O-[(3,4-dichlorophenyl)methylene]-D-glucitol, the polypropylene polymer, and any optional components are heated to a temperature equal to or greater than the melting point of the polypropylene polymer. Preferably, the mixture is heated to a temperature of about 170° C. or more, about 175° C. or more, about 180° C. or more, or about 185° C. or more. Further, the mixture preferably is heated to a temperature of about 210° C. or less, about 205° C. or less, or about 200° C. or less. Thus, in a series of preferred embodiment, the mixture is heated to a temperature of about 170° C. to about 200° C., about 180° C. to about 200° C., about 185° C. to about 200° C., or about 185° C. to about 195° C.

The polyolefin composition described herein is believed to be useful in producing thermoplastic articles. The polyolefin composition can be formed into the desired thermoplastic article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like.

The polyolefin composition described herein can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following example further illustrates the subject matter described above but, of course, should not be construed as in any way limiting the scope thereof.

Example

This example demonstrates a method for producing a polyolefin composition as described above and the properties of the resulting polyolefin composition. Seven one-kilogram batches of a polypropylene random copolymer composition (Samples 1A-1G) were compounded in accordance with the formulations set forth in Tables 1 and 2 below. The polypropylene random copolymer used in the compositions was Pro-fax SA849 polypropylene random copolymer from LyondellBasell Polymers, which had an initial Melt Flow Rate of approximately 12 g/10 min. The 1,3:2,4-bis-O-[(3,4-dimethylphenyl)methylene]-D-glucitol (referred to as "C.A. X" in the tables that follow) and 1,3:2,4-bis-O-[(3,4-dichlorophenyl)methylene]-D-glucitol (referred to as "C.A. Y" in the tables that follow) were synthesized in the applicant's laboratory.

TABLE 1

General formulation for Samples 1A-1G.

| Component | Amount |
| --- | --- |
| Polypropylene random copolymer flake | 1,000 g |
| Acid Scavenger (Calcium Stearate) | 0.40 g |
| Primary Antioxidant (Irganox ® 1010) | 0.50 g |
| Secondary Antioxidant (Irgafos ® 168) | 1.00 g |
| C.A. X | As noted in Table 2 below |
| C.A. Y | As noted in Table 2 below |
| Varox ® DBPH (vis-breaking agent) | 0.169 g |

TABLE 2

Amounts of Compound X and Compound Y used in Samples 1A-1G.

| Sample | Total of Amount C.A. X and C.A. Y Added (g) | Amount of C.A. X (%) | Amount of C.A. Y (%) |
| --- | --- | --- | --- |
| 1A | 1.50 | 100 | 0 |
| 1B | 1.50 | 90 | 10 |
| 1C | 1.50 | 75 | 25 |
| 1D | 1.50 | 50 | 50 |
| 1E | 1.50 | 25 | 75 |
| 1F | 1.50 | 10 | 90 |
| 1G | 1.50 | 0 | 100 |

Each of the polypropylene random copolymer compositions was compounded by blending the components in a Henschel high intensity mixer for approximately 1 minute at a blade speed of approximately 2,100 rpm. The samples were then melt compounded on a Deltaplast single screw compounding extruder with a 25 mm screw diameter and length/diameter ratio of 30:1. The barrel temperature of the extruder was set to 190° C. The extrudate (in the form a strand) for each sample was cooled in a water bath and subsequently pelletized.

The apparent melt viscosity of Sample 1A was measured using a Goettfert Rheo-Tester 2000 capillary rheometer in accordance with ASTM D3835-08. The apparent melt viscosity was measured at a temperature of 190° C. (the sample was conditioned in the rheometer for a 6 minute dwell time prior to testing) at an apparent shear rate of 100 s$^{-1}$ using a 1.00 mm diameter capillary die with a length to diameter ratio of 30:1. The apparent melt viscosity of Sample 1A was determined to be 408 Pa·s, which is believed to be representative of the apparent melt viscosity for all of the polyolefin compositions produced in this example.

Pellets of each of the resulting polyolefin compositions were molded into plaques with dimensions of approximately 51 mm×76 mm with a thickness of 1.27 mm using an Arburg 25 ton injection molder. All molder barrel zones were set to 190° C., and the mold was cooled to 35° C. The polymer was injected into the mold cavity at 15 cm$^3$/sec. Plaque dimensions were verified with a micrometer and after aging for 24 hours. The haze of the plaques was measured in accordance with ASTM Standard D1103-92 using a BYK-Gardner Haze-Guard Plus. The measured percent haze for the plaques are reported in Table 3 below.

TABLE 3

Haze values of plaques made from Samples 1A-1G.

| Sample | Haze (%) |
| --- | --- |
| 1A | 33 |
| 1B | 27 |
| 1C | 26 |
| 1D | 16 |
| 1E | 20 |
| 1F | 21 |
| 1G | 30 |

As can be seen from the data shown in Table 3, polypropylene random copolymer compositions containing a combination of 1,3:2,4-bis-O-[(3,4-dimethylphenyl)methylene]-D-glucitol ("C.A. X") and 1,3:2,4-bis-O-[(3,4-dichlorophenyl)methylene]-D-glucitol ("C.A. Y") (i.e., Samples 1B-1F) consistently produce plaques exhibiting lower haze levels than the polypropylene random copolymer compositions containing either C.A. X or C.A. Y alone (i.e., Samples 1A and 1 G, respectively). This improvement is observed across the entire range of relative concentrations tested. Furthermore, by comparing Sample 1D and 1 G, it can be seen that the compositions containing only one of C.A. X or C.A. Y can yield haze levels as much as 87.5% higher than the haze values for a composition containing a combination of C.A. X and C.A. Y. Applicant submits that these results are surprising given the widely held belief that C.A. X performs relatively poorly in higher melt viscosity resins that are processed at lower temperatures. In particular, it is surprising and unexpected that the performance of C.A. Y in this polymer could be improved by substituting a portion of the C.A. Y with a different compound (i.e., C.A. X) that typically performs poorly in this type of resin. Indeed, one would normally expect such a blend only to exhibit performance lying somewhere between the performance of the two individual components, making the observed synergy all the more surprising and unexpected.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polyolefin composition comprising:
   (a) a polypropylene polymer;
   (b) 1,3:2,4-bis-O-[(3,4-dimethylphenyl)methylene]-D-glucitol; and
   (c) 1,3:2,4-bis-O-[(3,4-dichlorophenyl)methylene]-D-glucitol, wherein the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 9:1 to about 1:9, and the polyolefin composition has an apparent melt viscosity of about 450 Pa·s or less at an apparent shear rate of 100 s$^{-1}$ and a temperature of 190° C.

2. The polyolefin composition of claim 1, wherein the polyolefin composition has an apparent melt viscosity of about 430 Pa·s or less at an apparent shear rate of 100 s$^{-1}$ and a temperature of 190° C.

3. The polyolefin composition of claim 2, wherein the polyolefin composition has an apparent melt viscosity of about 410 Pa·s or less at an apparent shear rate of 100 s$^{-1}$ and a temperature of 190° C.

4. The polyolefin composition of claim 1, wherein the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 3:1 to about 1:3.

5. The polyolefin composition of claim 1, wherein the total mass of 1,3:2,4-bis-O-[(3,4-dimethylphenyl)methylene]-D-glucitol and 1,3:2,4-bis-O-[(3,4-dichlorophenyl)methylene]-D-glucitol present in the composition is about 1,500 to about 2,500 ppm, based on the mass of the polypropylene polymer present in the composition.

6. The polyolefin composition of claim 1, wherein the polyolefin composition has a Melt Flow Rate (MFR) of about 25 g/10 min or more as measured in accordance with Procedure B of ASTM Standard D1238-10.

7. The polyolefin composition of claim 6, wherein the polyolefin composition has an MFR of about 30 g/10 min or more as measured in accordance with Procedure B of ASTM Standard D1238-10.

8. The polyolefin composition of claim 1, wherein the polyolefin composition has a Flow Rate Ratio (FRR) (MFR$_{10}$/MFR$_{2}$) of about 16 or less as measured in accordance with Procedure D of ASTM Standard D1238-10.

9. The polyolefin composition of claim 8, wherein the polyolefin composition has a FRR (MFR$_{10}$/MFR$_{2}$) of about 15.5 or less as measured in accordance with Procedure D of ASTM Standard D1238-10.

10. The polyolefin composition of claim 9, wherein the polyolefin composition has a FRR (MFR$_{10}$/MFR$_{2}$) of about 15 or less as measured in accordance with Procedure D of ASTM Standard D1238-10.

11. A method of producing the polyolefin composition of claim 1, the method comprising the steps of:
    (a) providing a polypropylene polymer;
    (b) providing 1,3:2,4-bis-O-[(3,4-dimethylphenyl)methylene]-D-glucitol;
    (c) providing 1,3:2,4-bis-O-[(3,4-dichlorophenyl)methylene]-D-glucitol;
    (d) mixing the 1,3:2,4-bis-O-[(3,4-dimethylphenyl)methylene]-D-glucitol and the 1,3:2,4-bis-O-[(3,4-dichlorophenyl)methylene]-D-glucitol with the polypropylene polymer to produce a mixture;
    (e) heating the mixture to a temperature equal to or greater than the melting point of the polypropylene polymer; and
    (f) cooling the heated mixture to a temperature below the melting point of the polypropylene polymer, thereby producing a polyolefin composition, wherein the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 9:1 to about 1:9, and the polyolefin composition has an apparent melt viscosity of about 450 Pa·s or less at an apparent shear rate of 100 s$^{-1}$ and a temperature of 190° C.

12. The method of claim 11, wherein the polyolefin composition has an apparent melt viscosity of about 430 Pa·s or less at an apparent shear rate of 100 s$^{-1}$ and a temperature of 190° C.

13. The method of claim 12, wherein the polyolefin composition has an apparent melt viscosity of about 410 Pa·s or less at an apparent shear rate of 100 s$^{-1}$ and a temperature of 190° C.

14. The method of claim 11, wherein the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 3:1 to about 1:3.

15. The method of claim 11, wherein the total mass of 1,3:2,4-bis-O-[(3,4-dimethylphenyl)methylene]-D-glucitol and 1,3:2,4-bis-O-[(3,4-dichlorophenyl)methylene]-D-glucitol present in the composition is about 1,500 to about 2,500 ppm, based on the mass of the polypropylene polymer present in the composition.

16. The method of claim 11, wherein the mixture is heated to a temperature of about 170° C. to about 200° C.

17. The method of claim 16, wherein the mixture is heated to a temperature of about 180° C. to about 200° C.

18. The method of claim 17, wherein the mixture is heated to a temperature of about 185° C. to about 195° C.

19. The method of claim 11, wherein the polyolefin composition has an MFR of about 25 g/10 min or more as measured in accordance with Procedure B of ASTM Standard D1238-10.

20. The method of claim 19, wherein the polyolefin composition has an MFR of about 30 g/10 min or more as measured in accordance with Procedure B of ASTM Standard D1238-10.

21. The method of claim 11, wherein the polyolefin composition has a Flow Rate Ratio (FRR) (MFR$_{10}$/MFR$_2$) of about 16 or less as measured in accordance with Procedure D of ASTM Standard D1238-10.

22. The method of claim 21, wherein the polyolefin composition has a FRR (MFR$_{10}$/MFR$_2$) of about 15.5 or less as measured in accordance with Procedure D of ASTM Standard D1238-10.

23. The method of claim 22, wherein the polyolefin composition has a FRR (MFR$_{10}$/MFR$_2$) of about 15 or less as measured in accordance with Procedure D of ASTM Standard D1238-10.

* * * * *